United States Patent
Mentze et al.

(10) Patent No.: US 10,104,724 B2
(45) Date of Patent: Oct. 16, 2018

(54) DIGITALLY-CONTROLLED SWITCH-MODE START-UP CIRCUIT WITH DIMMER COMPATIBILITY FOR LED-BASED LIGHTS

(71) Applicant: PHILIPS LIGHTING HOLDING B.V., Eindhoven (NL)

(72) Inventors: Erik J. Mentze, Austin, TX (US); Karl Thompson, Converse, TX (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 21 days.

(21) Appl. No.: 14/639,925

(22) Filed: Mar. 5, 2015

(65) Prior Publication Data

US 2015/0257231 A1 Sep. 10, 2015

Related U.S. Application Data

(60) Provisional application No. 61/948,175, filed on Mar. 5, 2014.

(51) Int. Cl.
*H05B 33/08* (2006.01)
*H02M 1/36* (2007.01)
(Continued)

(52) U.S. Cl.
CPC .......... *H05B 33/0815* (2013.01); *H02M 1/36* (2013.01); *H05B 33/0812* (2013.01); *H05B 33/0845* (2013.01); *H05B 33/0851* (2013.01); *H05B 33/0887* (2013.01); *H05B 37/00* (2013.01); *H02M 2001/0045* (2013.01)

(58) Field of Classification Search
CPC ........... H02M 2001/0006; H02M 1/36; H02M 2001/0045; H02M 3/156; H02M 3/158; H02M 3/33592; H02M 1/4225; H05B 33/0815; H05B 33/0812; H05B 33/0845;
(Continued)

(56) References Cited

U.S. PATENT DOCUMENTS 5,173,643 A 12/1992 Sullivan et al.
6,510,995 B2 1/2003 Muthu et al.
(Continued)

FOREIGN PATENT DOCUMENTS

EP 2083497 A2 7/2009
WO 2011092606 A1 8/2011

OTHER PUBLICATIONS

International Search Report and Written Opinion dated Aug. 19, 2014, during examination of PCT/US2014/0432736.

*Primary Examiner* — Monica C King

(57) ABSTRACT

Power consumption in a start-up circuit for a LED-based light bulb may be reduced by digitally switching a transistor of the start-up circuit coupled to the input voltage. When the transistor is digitally switched between on and off, a reduced amount of power is dissipated by the transistor, because it may not enter a saturation region of operation where the resistance of the transistor between drain and source terminals increases. The transistor may be coupled to a voltage regulator for generating one or more output voltages, including a supply voltage for a host controller IC. The transistor may be switched on and off by a digital signal generated by logic circuitry, which may decide to switch the transistor on and off based on a voltage level at an output of the voltage regulator.

13 Claims, 8 Drawing Sheets

(51) Int. Cl.
*H05B 37/00* (2006.01)
*H02M 1/00* (2006.01)

(58) Field of Classification Search
CPC ..................... H05B 33/0851; H05B 33/0887;
H05B 37/00; H05B 33/0848
See application file for complete search history.

(56) References Cited

U.S. PATENT DOCUMENTS

| | | |
|---|---|---|
| 6,696,803 B2 | 2/2004 | Tao et al. |
| 8,369,109 B2 | 2/2013 | Niedermeier et al. |
| 9,131,581 B1 * | 9/2015 | Hsia .................... H05B 33/086 |
| 2004/0085052 A1 | 5/2004 | Itabashi et al. |
| 2007/0058398 A1 | 3/2007 | Yang et al. |
| 2007/0080905 A1 * | 4/2007 | Takahara ............. G09G 3/3233 |
| | | 345/76 |
| 2009/0295300 A1 | 12/2009 | King |
| 2011/0309760 A1 | 12/2011 | Beland et al. |
| 2012/0146540 A1 | 6/2012 | Khayat et al. |
| 2012/0187997 A1 | 7/2012 | Liao et al. |

* cited by examiner

DIGITALLY-CONTROLLED SWITCH-MODE START-UP CIRCUIT WITH DIMMER COMPATIBILITY FOR LED-BASED LIGHTS

CROSS-REFERENCE TO RELATED APPLICATIONS

This application claims the benefit of priority of U.S. Provisional Patent Application No. 61/948,175 to Erik J. Mentze et al. filed Mar. 5, 2014 and entitled "A Digitally Controlled High Voltage (HV) Startup Circuit for LED Lighting Applications," which is incorporated by reference herein. This application is related by subject matter to U.S. patent application Ser. No. 14/639,843 to Erik J. Mentze et al. filed Mar. 5, 2015 and entitled "Digitally-Controlled Switch-Mode Start-Up Circuit For LED-Based Lights."

FIELD OF THE DISCLOSURE

The instant disclosure relates to lighting devices. More specifically, this disclosure relates to supply voltage generation for a controller in LED lighting.

BACKGROUND

Alternative lighting devices to replace incandescent light bulbs differ from incandescent light bulbs in the manner that energy is converted to light. Incandescent light bulbs include a metal filament. When electricity is applied to the metal filament, the metal filament heats and glows, radiating light into the surrounding area. The metal filament of conventional incandescent light bulbs generally has no specific power requirements. That is, any voltage and any current may be applied to the metal filament, because the metal filament is a passive device. Although the voltage and current need to be sufficient to heat the metal filament to a glowing state, any other characteristics of the delivered energy to the metal filament do not affect operation of the incandescent light bulb. Thus, conventional line voltages in most residences and commercial buildings are sufficient for operation of the incandescent bulb.

However, alternative lighting devices, such as compact fluorescent light (CFL) bulbs and light emitting diode (LED)-based bulbs, contain active elements that interact with the energy supply to the light bulb. These alternative devices are desirable for their reduced energy consumption, but the alternative devices have specific requirements for the energy delivered to the bulb. For example, the alternative devices may include controller integrated circuits (controller ICs) for controlling delivery of power to the LEDs, ballast, or other components of the bulb. The controller ICs are low-voltage devices built from similar components and with similar manufacturing techniques as computer devices, which also operate at low-voltages. However, whereas a computer device may have a bundled AC/DC adapter brick to generate the low voltages for operating controller ICs, light bulbs have limited space and cannot include a conventional AC/DC adapter. Instead, LED-based bulbs include a small switch-mode power supply that is configured to accept a high voltage AC line input to provide a DC low voltage output, much lower than the line input, to power the controller IC during normal operation. During the initial turn-on of the LED-based bulb, the DC low voltage output of the switch-mode power supply is unable to provide power for the controller IC and a start-up circuit is included with the switch-mode power supply to start the system and provide a temporary power supply while the primary supply is brought on-line.

FIG. 1 is one example of a conventional startup circuit 100 for an LED-based bulb in accordance with the prior art. The circuit 100 includes a high-voltage power field effect transistor (HV power FET) 112 coupled to an AC voltage input $V_{IN}$ node 102 through resistor 113. The HV power FET 112 is biased in saturation mode with a zener diode 122 and generates supply voltage $V_{DD,H}$ at node 106. The circuit 100 draws a high peak current from the $V_{IN}$ node 102 and continues to draw a small continuous current when the auxillary voltage input $V_{AUX}$ node is lower than the voltage $V_{DD,H}$ at node 106. The circuit 100 dissipates large amounts of power within the HV power FET 112, because of the continuous current draw, which at times is very high, and the bias condition of HV power FET 112. When the HV power FET 112 is integrated with other components into an integrated circuit (IC) for the LED-based bulb, the heat generated by the HV power FET 112 makes construction of the IC difficult. For example, the HV power FET 112 must be large enough to dissipate the heat without exceeding maximum power dissipation specifications. The larger size of the HV power FET 112 increases the cost of the IC and makes the IC difficult to incorporate to a light bulb.

FIG. 2 is another example of a conventional startup circuit 200 for an LED-based bulb in accordance with the prior art. The circuit 200 includes a depletion-mode power FET 212 coupled to an AC input voltage $V_{IN}$ node 102. The depletion power FET 212 is biased in saturation mode by zener diode 214 to generate a low voltage at $V_{DD,H}$ supply output node 106. Supply voltage $V_{DD,H}$ may be supplied to a controller to operate the controller 214 during start-up. Like circuit 100 of FIG. 1, circuit 200 continues to draw current from the $V_{IN}$ node 102 when the auxiliary voltage input $V_{AUX}$ node is lower than the voltage $V_{DD,H}$ at node 106. Although the depletion power FET 212 may only dissipate power during a transition time for the depletion power FET 212 to reduce power consumption, the circuit 200 is limited to low power applications where a required load current is less than approximately 0.5 milliAmperes. When load current is increased beyond 0.5 milliAmperes, power dissipation by the depletion power FET 212 creates similar problems to those described above in the circuit 100 of FIG. 1.

In both of the conventional start-up circuits described with reference to FIG. 1 and FIG. 2, the input voltage $V_{IN}$ node 102 is dropped across the power FET 112 or 212 when bias in saturation mode. Further, the output currents from the start-up circuits may be insufficient for starting up digital controllers, which may consume up to 5 or more milliAmperes. Thus, a circuit for providing larger load current with reduced power dissipation is needed.

Shortcomings mentioned here are only representative and are included simply to highlight that a need exists for improved start-up circuit for low power dissipation, particularly for lighting devices and consumer-level devices. Embodiments described here address certain shortcomings but not necessarily each and every one described here or known in the art.

SUMMARY

Power consumption by a start-up circuit may be reduced by operating a power FET coupled to the input voltage as a switch. Digital control may include, for example, coupling the gate of the power FET to ground to turn off the power FET. When the power FET is turned off, the start-up circuit may consume little or no power from the input voltage. When the power FET is digitally switched between on and off states, the power dissipation within the power FET is reduced because the power FET is operated in switch-mode. In one embodiment, a switch-mode operated power FET may not be operated in a saturation mode where the resistance of the power FET between drain and source terminals increases. The power FET may be coupled to a voltage regulator for generating one or more output voltages. The power FET may be switched on and off by a digital signal generated by logic circuitry, which may decide to switch the power FET on and off based on the voltage regulator output(s).

The power FET may also be operated after start-up to provide dimmer compatibility during normal operation of the LED-based bulb. Logic circuitry associated with the start-up circuit may receive control signals from a host controller IC. The host controller IC may direct the logic circuitry to configure the power FET to provide dimmer compatibility.

According to one embodiment, an apparatus may include the following: 1) a voltage regulator configured to provide an output voltage for operating a lighting controller; 2) power FET coupled to the voltage regulator and configured to provide a supply current to the voltage regulator from a line input; and/or 3) a gate drive circuit coupled to a gate of the power FET and configured to operate the power FET as a switching-mode power supply during a start-up mode of the lighting controller.

In some embodiments, the apparatus may also include a digital control loop configured to monitor an auxiliary output voltage node $V_{AUX}$. When the output voltage node $V_{AUX}$ reaches a first threshold voltage, the digital control loop signals the gate driver circuit coupled to the gate of the power FET to ground the gate of the power FET thus turning the power FET off. When the output voltage node $V_{AUX}$ reaches a second threshold voltage which is greater in magnitude than the first threshold voltage, the digital control loop signals the gate driver circuit coupled to the gate of the power FET to apply power the gate of the power FET thus turning the power FET on.

In certain embodiments, the gate drive circuit may be configured to operate the power FET during a start-up period of the lighting controller; the gate drive circuit may be configured to digitally turn off the power FET after the start-up period of the lighting controller; the power FET may be a depletion-mode power FET and be part of a current power train having a second enhancement-mode power FET coupled to the depletion-mode power FET, and having a diode coupled to a source of the depletion-mode power FET and coupled to a drain of the enhancement-mode power FET; the gate drive circuit may include an inverter coupled to the gate of the power FET, wherein the inverter may be configured to provide a voltage that is a greater of voltages comprising a supply voltage and a voltage at a source of the power FET; the digital control loop may be further configured to, after a second threshold voltage is reached by the monitored output voltage, control the gate drive circuit to couple the gate of the power FET to a supply voltage node; the digital control loop may include a comparator for comparing the output voltage of the voltage regulator and a reference voltage corresponding to the first threshold voltage; the digital control loop may include logic circuitry coupled to the comparator and the logic circuitry may be configured to output a control signal to the gate of the power FET based, at least in part, on an output of the comparator; and/or the voltage regulator, the power FET, and the gate drive circuit may be integrated into an integrated circuit (IC) and the resistor is external to the integrated circuit (IC).

According to another embodiment, a method may include receiving a line voltage at a power FET; providing, by the power FET, a current supply to a voltage regulator from the power FET; generating, by the voltage regulator, a supply voltage for a lighting controller from the current supply; and/or operating, by a gate drive circuit coupled to a gate of the power FET, the power FET as a switching-mode power supply for providing the current supply.

In some embodiments, the method may also include monitoring, by a digital control loop, a voltage at an auxiliary output node coupled to the power FET; determining, by the digital control loop, when the monitored voltage reaches a first threshold; digitally turning off the power FET after the monitored voltage reaches the first threshold; determining, by the digital control loop, when the monitored voltage reaches a second threshold; digitally turning on the power FET after the monitored voltage reaches the second threshold; and/or dissipating power in an external resistor coupled to the power FET.

In certain embodiments, the step of operating the power FET may include operating the power FET as a switching-mode power supply during a start-up phase of the lighting controller; and/or the step of operating the power FET may include digitally turning off the power FET after the start-up phase of the lighting controller.

According to a further embodiment, an apparatus may include a voltage regulator configured to generate an output voltage for supplying a lighting controller; a current power train comprising a power FET and coupled to the voltage regulator; a gate drive circuit coupled to a gate of the power FET; and/or a logic circuit coupled to the gate drive circuit and configured to operate the field-effect transistor as a switching-mode power supply.

In some embodiments, the apparatus may also include a comparator coupled to the logic circuit, wherein the comparator may be configured to provide a signal to the logic circuit proportional to a difference between an auxiliary output node voltage and a reference voltage.

In certain embodiments, the power FET may be a high-voltage (HV) depletion-mode power FET; the current power train may include a low-voltage (LV) enhancement-mode power FET, wherein a drain of the LV power FET is coupled to a source of the HV power FET and a diode coupled to the drain of the LV power FET and the source of the HV power FET; the gate drive circuit may include an inverter coupled to the gate of the field-effect transistor, wherein a power supply input to the inverter may be a greater of a voltage at a source of the power FET and the output voltage of the voltage regulator; and/or the logic circuitry may be configured to digitally switch the power FET based on the comparator signal.

According to one embodiment, an apparatus may include a voltage regulator configured to provide an output voltage for operating a lighting controller; a power FET coupled to the voltage regulator and configured to provide a supply current to the voltage regulator from a line input; and/or a logic circuit coupled to the power FET and configured to control the power FET during a start-up phase of the lighting controller and to control the power FET to provide dimmer compatibility.

In some embodiments, the apparatus may also include a digital feedback loop coupled to an input signal proportional to the source of the field-effect transistor and coupled to a reference signal, wherein the logic circuitry may be configured to cause the power FET to conduct when the digital feedback loop indicates the input signal is below the reference signal and to cause the power FET to not conduct when the digital feedback loop indicates the input signal has reached the reference signal; and/or a digital feedback loop coupled to an input signal proportional to a source of the field-effect transistor and coupled to a reference signal, wherein the logic circuitry may be configured to cause the power FET to conduct and the second power FET to not conduct, to direct current to the diode, when the digital feedback loop indicates the input signal is below the reference signal and to cause the power FET to conduct and the second power FET to conduct when the digital feedback loop indicates the input signal has reached the reference signal.

In certain embodiments, the logic circuit may include a mode input node configured to receive a mode input from the lighting controller, wherein the logic circuit may be configured to control the power FET based, at least in part, on the mode input; the power FET may be part of a current power train, the current power train, wherein the current power train may include a second power FET coupled to a source of the first power FET and a diode coupled to the source of the power FET and coupled to the drain of the second power FET; the logic circuitry may be configured to control a gate of the power FET to operate the power FET as a switching-mode power supply for the lighting controller during the start-up phase of the lighting controller; the logic circuitry may be configured to control a gate of the field-effect transistor and a gate of the second power FET to turn off the power FET and the second power FET; the logic circuitry may be configured to control a gate of the field-effect transistor and a gate of the second power FET to turn on the power FET and the second power FET; the logic circuitry may be configured to control a gate of the field-effect transistor and a gate of the second power FET to alternate driving current to the diode and driving current to the second field effect transistor (power FET) to a ground; the power FET may be a depletion-mode power FET and the second power FET may be an enhancement-mode power FET; and/or the logic circuit may include control sequencing logic.

According to another embodiment, a method may include receiving a line voltage at a power FET; providing, by the power FET, a current supply to a voltage regulator; generating, by the voltage regulator, a supply voltage for a lighting controller from the current supply; and/or operating, by a gate drive circuit coupled to a gate of the power FET, the power FET during a start-up phase of the lighting controller and after the start-up phase to provide dimmer compatibility.

In some embodiments, the method may also include receiving, from the lighting controller, a mode selection for operating the power FET to provide dimmer compatibility; receiving a feedback signal indicating a voltage level at an output node coupled to the power FET, wherein the step of operating the power FET as a switching-mode power supply may include digitally switching the power FET based, at least in part, on the feedback signal; turning on a second power FET coupled to the power FET and coupled to the ground; and/or receiving a feedback signal indicating a voltage level at an output node coupled to the power FET, wherein the step of alternating may include alternating driving current through the power FET to the voltage regulator and driving current through the power FET to a ground based, at least in part, on the feedback signal.

In certain embodiments, the step of operating the power FET during the start-up phase may include operating the power FET as a switching-mode power supply during a start-up phase of the lighting controller; the step of operating the power FET after the start-up phase may include turning off the power FET; the step of operating the power FET after the start-up phase may include controlling the power FET to conduct current from the line voltage input node to a ground; and/or the step of operating the power FET after the start-up phase may include alternating driving current through the power FET and a diode to the voltage regulator and driving current through the power FET to a ground.

According to a further embodiment, an apparatus may include a voltage regulator configured to generate an output voltage for supplying a lighting controller; a current power train comprising a power FET and coupled to the voltage regulator and a line voltage input node; a gate drive circuit coupled to a gate of the power FET; and/or a logic circuit coupled to the gate drive circuit and configured to control the power FET during a start-up phase of the lighting controller and to control the power FET to provide dimmer compatibility.

In some embodiments, the apparatus may also include a feedback loop coupled to the logic circuit, wherein the feedback loop provides a feedback signal indicating a difference between a voltage at an output of the current power train and a reference voltage, and the logic circuit may be configured to operate the current power train based, at least in part, on the feedback signal.

In certain embodiments, the current power train may include a second power FET coupled to the power FET and a diode coupled to a source of the power FET and coupled to the drain of the second power FET; the power FET may be a depletion-mode power FET and the second power FET may be an enhancement-mode power FET; the logic circuit may include a mode input node configured to receive a mode input from the lighting controller, wherein the logic circuit may be configured to control the current power train based, at least in part, on the mode input; the logic circuit may be configured to operate the current power train in at least one of the following modes; and/or the logic circuit may be configured to operate the current power train in at least one of the following modes: a first mode that operates the power FET as a switching-mode power supply for the lighting controller during the start-up phase of the lighting controller, a second mode that disables the current power train, a third mode that controls the current power train to conduct current from the line voltage input node to a ground, and a fourth mode that alternates driving current through the current power train to the voltage regulator and driving current through the current power train to a ground.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
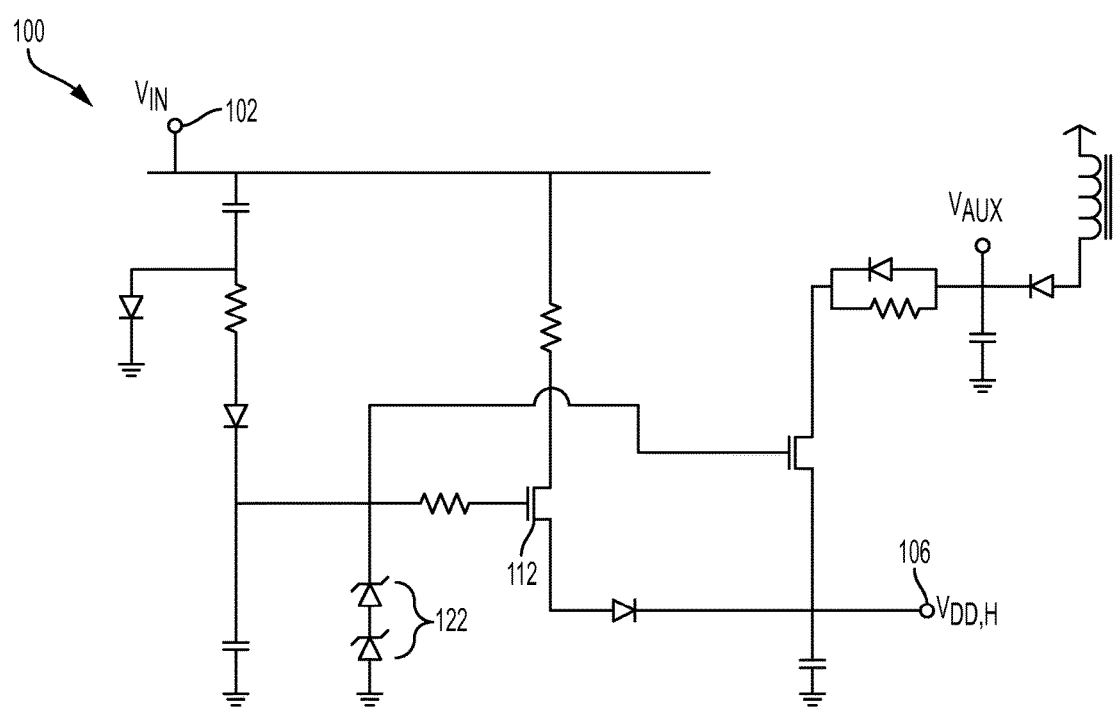
FIG. 1 is an example circuit schematic illustrating a conventional startup circuit for an LED-based bulb in accordance with the prior art.
Figure 2:
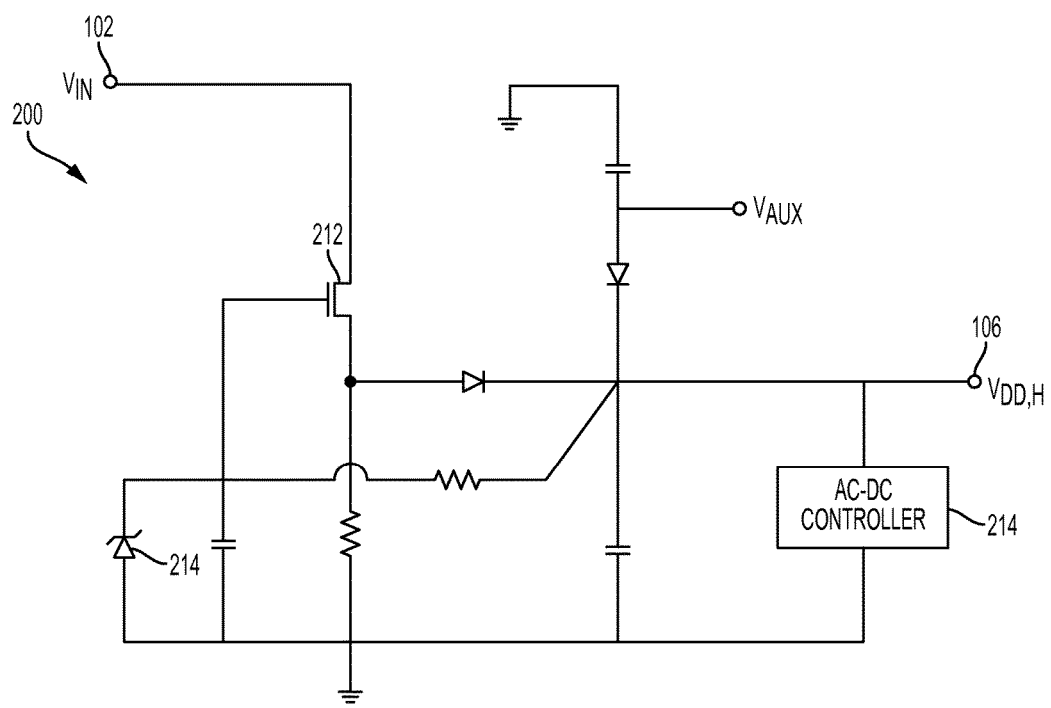
FIG. 2 is another example circuit schematic illustrating a conventional startup circuit for an LED-based bulb in accordance with the prior art.
Figure 3:
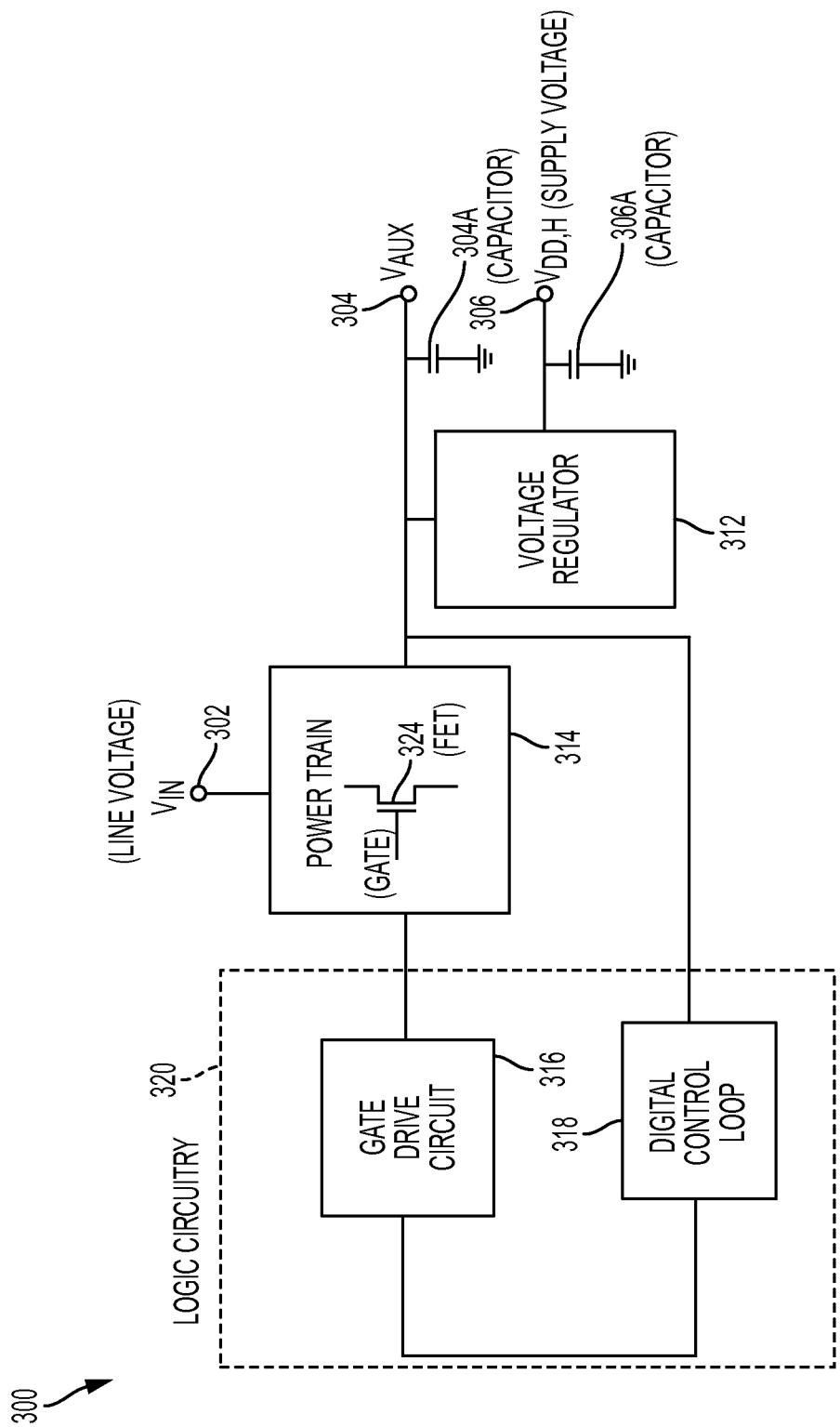
FIG. 3 is an example block diagram illustrating a digitally-controlled switch-mode start-up circuit for generating a controller supply voltage according to one embodiment of the disclosure.

FIG. 3 is an example block diagram illustrating a digitally-controlled switch-mode start-up circuit for generating a controller supply voltage according to one embodiment of the disclosure. A voltage regulator 312 may indirectly control an auxiliary output voltage $V_{AUX}$ at output node 304 and directly control a supply voltage $V_{DD,H}$ at output node 306. The $V_{DD,H}$ voltage may be, for example, a supply voltage of approximately 5-15 Volts for a controller integrated circuit (controller IC) and may be lower than the $V_{AUX}$ voltage. The output node 306 for $V_{AUX}$ may be coupled to a winding of a transformer (not shown) that provides current to the voltage regulator 312 when the start-up circuit 300 is off. Each of the output nodes 304, 306 may be held relatively constant by capacitors 304A, 306A, respectively.

The voltage regulator 312 may receive power, through power train 314, from an input node 302 receiving an input voltage $V_{IN}$, such as a line voltage $V_{LINE}$. The power train 314 may include a transistor 324 for applying power from the input node 302 to the voltage regulator 312. The power train 314 may be controlled by logic circuitry 320, including a gate drive circuit 316 and a digital control loop 318. The gate drive circuit 316 may generate a signal for input to a gate of the transistor 324. The signal generated by the gate drive circuit 316 may, for example, control the transistor 324 to generate a desired auxiliary voltage $V_{AUX}$ level at output node 304. In one embodiment, the power train 314 may directly couple to the $V_{AUX}$ node 304 through a diode. The gate drive circuit 316 may receive, through the digital control loop 318, feedback about operation of the power train 314. For example, the digital control loop 318 may provide information about a voltage level of auxiliary voltage $V_{AUX}$ at output node 304.

In one embodiment, the transistor 324 may be a high-voltage depletion-mode power FET. The power train 314 may also include other transistors (not shown), such as a low-voltage enhancement-mode power FET, and other components, such as blocking diodes. At start-up, current may be drawn from the input node 302 through the transistor 324 to charge capacitor 304A for output node 304. The transistor 324 may be boot-strapped during start-up of the circuit 300 to keep the transistor 324 in an "on" state while capacitor 304A charges to a level for normal operation of the LED-based bulb.

Figure 6:
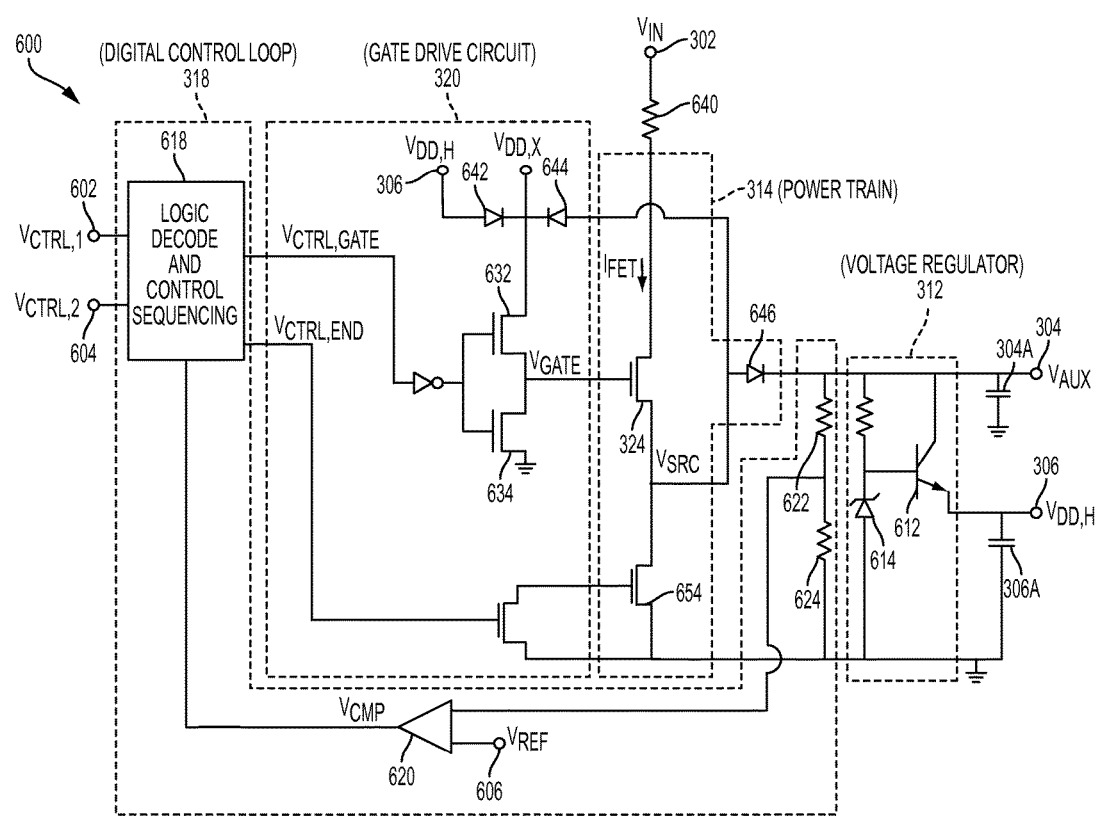
FIG. 6 is an example circuit schematic illustrating digital control of a power FET for generating a controller supply voltage and providing dimmer compatibility according to one embodiment of the disclosure.

The gate drive circuit 316 may control the transistor 324 by digitally switching the transistor 324 on and off. For example, during start-up, the gate drive circuit 316 may apply a $V_{DD,X}$ (not shown) voltage to the gate of the transistor 324. The $V_{DD,X}$ voltage may track a source voltage of the transistor 324 to hold the transistor 324 in an "on" state. The $V_{DD,X}$ voltage may increase as the auxiliary voltage $V_{AUX}$ at capacitor 304A increases. The digital control loop 318 may monitor the auxiliary voltage $V_{AUX}$ level and provide feedback to the gate drive circuit 316 for control of the power train 314. When the digital control loop 318 detects the auxiliary voltage $V_{AUX}$ reaches or exceeds a first threshold level, the gate drive circuit 316 may couple a ground to the gate of the transistor 324. The transistor 324 then transitions to an "off" state after a sufficiently negative gate-source voltage $V_{GS}$ is generated to hold the transistor 324 in the "off" state. When the digital control loop 318 detects the auxiliary voltage $V_{AUX}$ level decreases to a second threshold level, lower than the first threshold level, the gate drive circuit 316 may drive $V_{DD,X}$ voltage to the gate of the transistor 324 to transition the transistor 324 back to an "on" state. When the transistor 324 returns to the "on" state, the capacitor 304A begins to charge and the auxiliary voltage $V_{AUX}$ increases until the digital control loop 318 again detects reaching of the first threshold level. In one embodiment shown in FIG. 6, $V_{DD,X}$ may be selected from a greater of the supply voltage $V_{DD,H}$ at output node 306 and a source voltage $V_{SRC}$ of the transistor 324 by diodes 642 and 644 (as shown in FIG. 6).

Operation of the circuit 300 with transistor 324 as described above results in the transistor 324 being operated in switch-mode in either an "on" state or an "off" state, rather than in an active region of operation of the transistor 324. Operating the transistor 324 as a switch minimizes power dissipation by the transistor 324 and thus allows the size of the transistor 324 to be reduced. The size of the transistor 324 represents a large portion of the space occupied by circuit 300. Thus, a reduction in size of the transistor 324 allows for a significant reduction in the size of the circuit 300 and also the cost of manufacturing the circuit 300 as an integrated circuit (IC).

Figure 4:
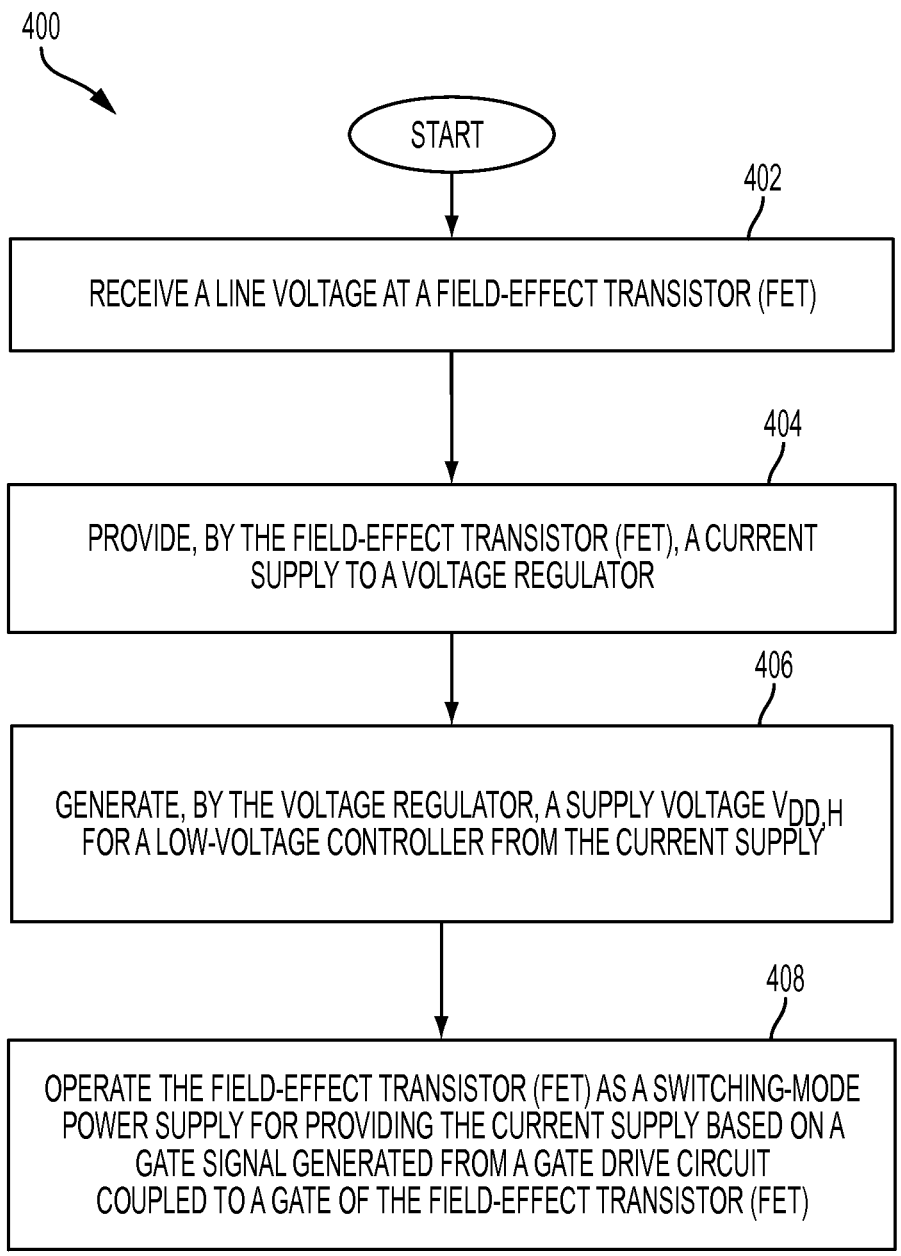
FIG. 4 is an example flow chart illustrating a method for operating a switch-mode start-up circuit for generating a controller supply voltage according to one embodiment of the disclosure.

As described above, the transistor 324 may be operated in a switching-mode to generate a supply voltage $V_{DD,H}$. FIG. 4 is an example flow chart illustrating a method for operating a switching-mode power supply for generating a controller supply voltage according to one embodiment of the disclosure. A method 400 begins at block 402 with receiving a line voltage at a power FET. At block 404, a current supply may be provided to the voltage regulator by the power FET. At block 406, a supply voltage $V_{DD,H}$ may be generated by the voltage regulator from the current supply of block 404. The supply voltage $V_{DD,H}$ may be a supply voltage for a low-voltage controller IC. At block 408, a gate drive circuit coupled to a gate of the power FET may operate the power FET as a switching-mode power supply for providing the current supply to voltage regulator. Block 408 may include, for example, switching on the power FET to increase charge at a capacitor coupled to the $V_{DD,H}$ output node and switching off the power FET to decrease charge at the capacitor. Varying a charge level of the capacitor may result in a proportionate increase or decrease of the $V_{DD,H}$ voltage. Thus, switching-mode operation of the power FET may allow the gate drive circuit to regulate a voltage level of the $V_{DD,H}$ voltage during start-up of a LED-based light bulb. Variations in the $V_{DD,H}$ voltage may be reduced by the voltage regulator and timing the switching of the power FET.

Figure 5:
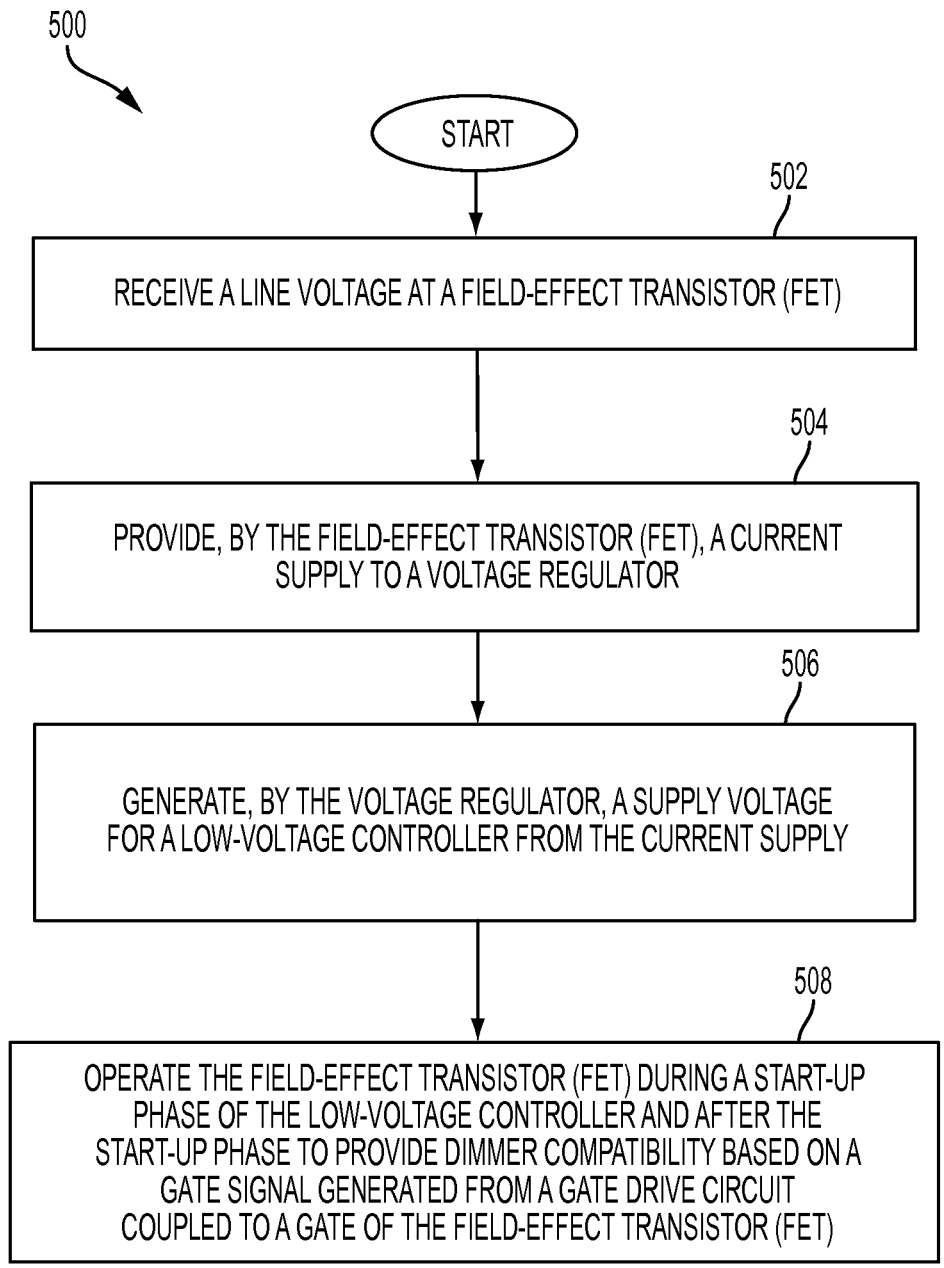
FIG. 5 is an example flow chart illustrating a method for digitally controlling operation of a start-up circuit to provide dimmer compatibility according to one embodiment of the disclosure.

In addition to providing start-up capability, the transistor 324 may be used to provide dimmer compatibility. FIG. 5 is an example flow chart illustrating a method for digitally controlling operation of a start-up circuit to provide dimmer compatibility according to one embodiment of the disclosure. Blocks 502, 504, and 506 of method 500 may be similar to blocks 402, 404, and 406 of method 400. That is, a line voltage may be received at a power FET at block 502, a current supply may be provided by the power FET to a voltage regulator at block 504, and a supply voltage $V_{DD,H}$ may be generated by the voltage regulator from the current supply at block 506. Controlling operation of the power FET from the gate drive circuit may differ at block 508 compared to block 408 of FIG. 4.

At block 508, the power FET may be operated to generate the supply voltage $V_{DD,H}$ during start-up and may also be operated to provide dimmer compatibility by generating the supply voltage $V_{DD,H}$ after the LED-based light bulb has started. In one embodiment, dimmer compatibility may be provided by providing a path to ground through a controlled impedance such that internal time constants of a dimmer are not interrupted. For example, FETs 324 and 624 illustrated in FIG. 3 and FIG. 6, respectively, may pull a controlled amount of current from line voltage at input node $V_{IN}$ to ground. This path to ground through resistor 640 may provide a controlled impedance. Generally, LED-based light bulbs may be limited to operation from on/off light switches. When dimmer compatibility is integrated into the LED-based light bulb, the light bulb may operate with dimmer switches to allow a nearly continuous range of operation from off to on. Dimmer compatibility allows the LED-based light bulbs, which are capacitive in nature, to operate from conventional dimmers, such as in homes, which are designed for use with conventional bulbs that are resistive in nature and that always provide a current path. However, conventionally such dimmer compatibility is implemented in additional circuitry separate from the start-up circuit.

The gate drive circuit at block 508 may control the power FET during start-up and after start-up to generate the supply voltage $V_{DD,H}$. In one embodiment, the gate drive circuit may be configured to receive a digital input from a host control IC to modify operation of the power FET by the gate drive circuit. Thus, circuitry in a control IC may be reduced by operating the power FET during start-up and operation of the dimmed LED-based light bulb.

The circuit 300 of FIG. 3 may be configured to be controlled by a digital input received from a host controller IC. FIG. 6 is an example circuit schematic illustrating digital control of a power FET for generating a controller supply voltage and providing dimmer compatibility according to one embodiment of the disclosure. The gate of transistor (power FET) 324 may be coupled to transistors 632 and 634, which may be configured as a complimentary metal-oxide-semiconductor inverter (CMOS inverter). A control signal $V_{CTRL,GATE}$ generated by the digital control loop 318 may be provided to the gate drive circuit 320 for controlling the transistors 632 and 634. The $V_{CTRL,GATE}$ control signal may switch an applied gate voltage of the transistor 654 between $V_{DD,X}$ and ground. For example, when the $V_{CTRL,GATE}$ signal is high, the transistor 632 may be closed to couple $V_{DD,X}$ to the gate of the transistor 654 and the transistor 634 may be open to disconnect the gate of the transistor 654 from ground. In another example, when the $V_{CTRL,GATE}$ signal is low, the transistor 632 may be open to disconnect $V_{DD,X}$ from the gate of the transistor 654 and the transistor 634 may be closed to connect the gate of the transistor 324 to ground. Thus, the digital control loop 318 may control application of a gate $V_{GATE}$ by the gate drive circuit 320 to the transistor 324.

When the gate power FET of the transistor 324 is connected to $V_{DD,X}$, the transistor 324 may be in an "on" state and current may flow from the input node 302 through resistor 640, through the transistor 324 and through blocking diode 646 to the voltage regulator 312. Additionally, current may flow directly to the $V_{AUX}$ capacitor 304A. The voltage regulator 312 may regulate flow of current to the $V_{AUX}$ capacitor 304A and the $V_{DD,H}$ capacitor 306A. The resistor 640 may be external to an integrated circuit containing circuit 600. In circuit 600, a large portion of the input voltage $V_{IN}$ may be dropped across the resistor 640. Thus, power dissipation in transistor 324 may be reduced. The resistance of resistor 640 may be selected to regulate a current through the transistor 324 when the transistor 324 is switched on. The current flows through blocking diode 646 to the voltage regulator 312. The transistor 612 may operate as a linear regulator for driving current from the power train 314 to capacitor 304A and 306A to generate $V_{AUX}$ and $V_{DD,H}$, respectively. The transistor 612 may be biased by Zener diode 614.

The $V_{CTRL,GATE}$ signal may be generated by logic decode and control sequencing block 618 of the digital control loop 318. The control loop 318 may also include a comparator 620, resistors 622 and 624, and reference voltage $V_{ref}$ input node 606. The resistors 622 and 624 may divide the voltage that is across the voltage regulator 312 according to a ratio defined by the comparative resistance values of the resistors 622 and 624. The resistor 624 may also act as a sense resistor to provide the comparator 620 a voltage level that is a fraction of the voltage across the voltage regulator 312. The comparator 620 may compare the voltage across resistor 624 to reference voltage $V_{ref}$. The $V_{ref}$ voltage may correspond to a first threshold level described above with reference to FIG. 3. An output $V_{CMP}$ of the comparator 620 provides feedback to logic block 618 regarding whether a voltage level of $V_{AUX}$ is at or above a first threshold voltage. The logic block 618 may switch the $V_{CTRL,GATE}$ signal between high and low to switch transistor 324 on and off based on the $V_{CMP}$ feedback. For example, when $V_{CMP}$ indicates the $V_{AUX}$ signal reaches a first threshold level, the $V_{CTRL,GATE}$ signal may be switched to turn off the transistor 324. The logic block 618 may also switch a $V_{CTRL,GND}$ signal between high and low to switch the gate of transistor 654 to ground to switch off transistor 654.

The logic block 618 may also receive digital control inputs $V_{CTRL,1}$ and $V_{CTRL,2}$ at mode input nodes 602 and

604. $V_{CTRL,1}$ and $V_{CTRL,2}$ inputs may be provided by a host controller IC as feedback for controlling the transistor 324 to provide dimmer compatibility. In one embodiment, pull-down resistors (not shown) may be coupled to the input nodes 602 and 604 and to ground to set the logic block 618 by default into Mode 0 for start-up. The logic block 618 may control circuit 600 based on the $V_{CTRL,1}$ and $V_{CTRL,2}$ inputs based on control described in Table 1.

TABLE 1

Control signals for controlling circuit 600 and the resulting operation of circuit 600 for dimmer compatibility according to one embodiment of the disclosure.

| Mode | $V_{CTRL,1}$ | $V_{CTRL,2}$ | $V_{CMP}$ | power FET 324 | power FET 624 |
|---|---|---|---|---|---|
| 0 (HVS) | 0 | 0 | 0 | On | Off |
|  | 0 | 0 | 1 | Off | Off |
| 1 (OFF) | 0 | 1 | X | Off | Off |
| 2 (BLEED TO GROUND) | 1 | 0 | X | On | On |
| 3 (BLEED TO AUX OR GROUND) | 1 | 1 | 0 | On | Off |
|  | 1 | 1 | 1 | On | On |

The four modes described in Table 1 may enable configurations of the circuit 600 with the transistor 324 for providing dimmer compatibility. Mode 0, signaled by a low signal at $V_{CTRL,1}$ and $V_{CTRL,2}$ inputs, may be a start-up mode with operation similar to that described above with reference to FIG. 3. In Mode 0, the transistor 654 may be switched off and the transistor 324 is toggled on and off based on the output of the comparator 620. The transistor 324 may be switched off when the comparator 620 indicates $V_{AUX}$ is above a first threshold level by outputting a high signal. The transistor 324 may be switched on when the comparator 620 indicates $V_{AUX}$ is below a first threshold level by outputting a low signal. In Mode 1, signaled by a low $V_{CTRL,1}$ and a high $V_{CTRL,2}$ signal, the transistors 324 and 624 are turned off. In mode 2, charge is conducted from line to ground. Mode 2 is signaled by a high $V_{CTRL,1}$ and low $V_{CTRL,2}$ signal. In Mode 2, the transistors 324 and 624 may be both switched on regardless of comparator 620 output. In Mode 3, the transistor 324 may be always on and the comparator 620 output determines whether to transfer charge to capacitor 304A or to ground. The transistor 654 may be turned on when the comparator 620 output is high indicating $V_{AUX}$ has reached a first threshold level to dump current to ground. The transistor 654 may be turned off when the comparator 620 output is high indicating $V_{AUX}$ is below the first threshold level to dump current to capacitor 304A. Mode 3 may allow a host controller IC to recover from a low supply voltage $V_{DD,H}$ before the host controller IC begins malfunctioning due to a too low supply voltage $V_{DD,H}$.

Figure 7:
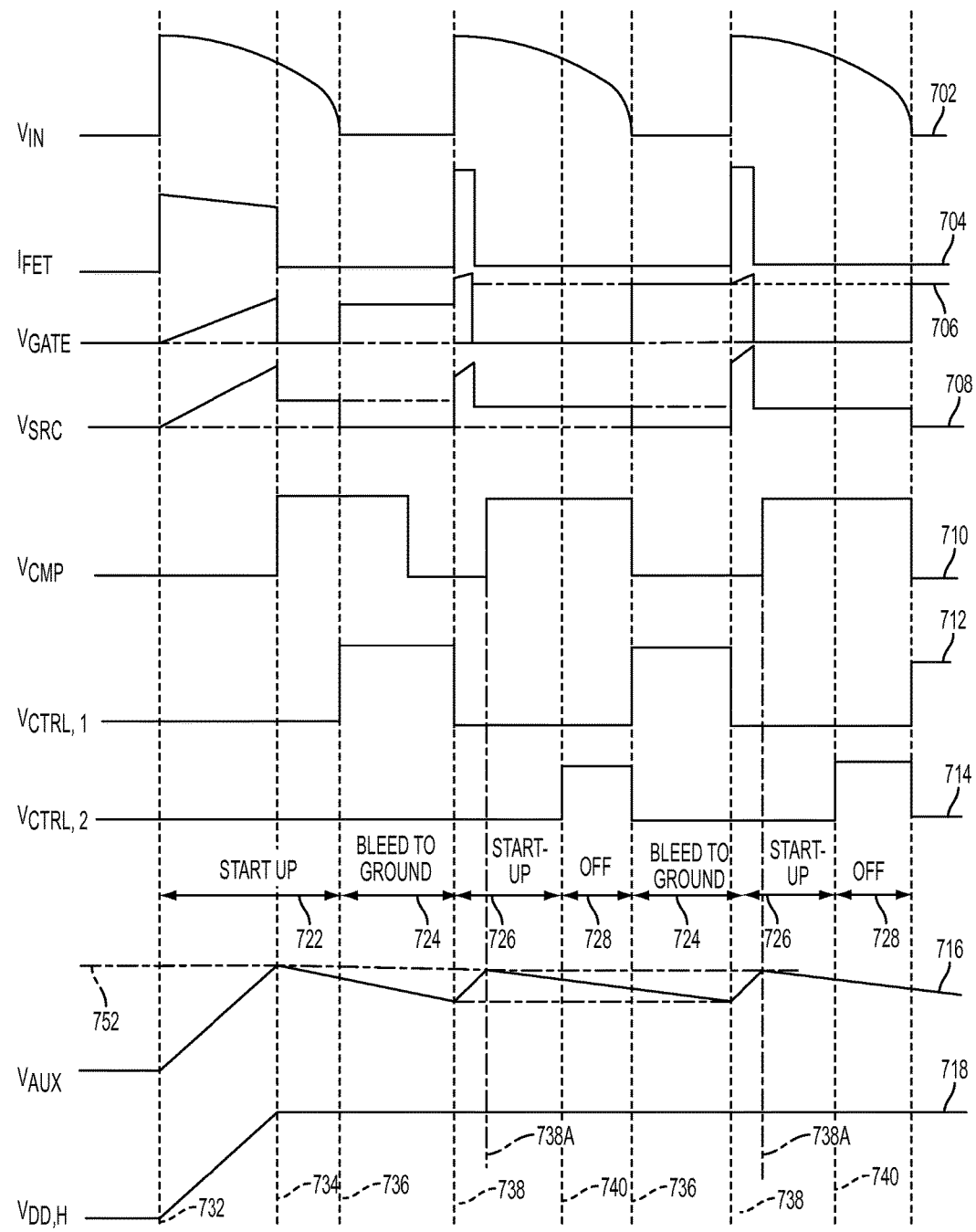
FIG. 7 are example graphs illustrating operation of the circuit of FIG. 6 to provide start-up and dimmer compatibility in an LED-based bulb according to one embodiment of the disclosure.

Illustration of one method of operating the circuit 600 of FIG. 6 is illustrated with the signals shown in FIG. 7. FIG. 7 includes example graphs illustrating operation of the circuit of FIG. 6 to provide start-up and dimmer compatibility in an LED-based bulb according to one embodiment of the disclosure. At time 732, the circuit 600 enters start-up mode 722 when $V_{CTRL,1}$ 712 and $V_{CTRL,2}$ 714 are low. Input voltage 702 shows a leading edge (LE) line voltage generated by a dimmer. In start-up mode 722, the gate of the transistor 324 is coupled to the source of the transistor 324. Thus, the voltage $V_{GATE}$ 706 and voltage $V_{SRC}$ 708 increase together. Current $I_{FET}$ through the transistor 324 is shown in line 704 and follows the input voltage $V_{IN}$ of line 702 while the transistor 324 is on. The auxiliary voltage $V_{AUX}$ and supply voltage $V_{DD,H}$ increase as capacitors 304A and 306A are charged from current $I_{FET}$. At time 734, the comparator 620 output $V_{CMP}$ of line 710 switches to high when auxiliary voltage $V_{AUX}$ 716 reaches a first threshold 752. The logic block 618 may then switch $V_{GATE}$ 706 to ground to turn off the transistor 324. Auxiliary voltage $V_{AUX}$ 716 may then decrease after time 734 as capacitor 304A discharges. The supply voltage $V_{DD,H}$ in line 718 may be held relatively constant after the beginning of the start-up mode 722.

After the start-up mode 722, the logic block 618 may receive mode inputs on $V_{CTRL,1}$ and $V_{CTRL,2}$ from a host controller IC to provide dimmer compatibility, which may allow circuit 600 to continue to provide supply voltage $V_{DD,H}$ 718 during normal operation of the LED-based bulb. At time 736, the host controller IC may indicate a bleed-to-ground mode 724 by generating a high $V_{CTRL,1}$ 712 and low $V_{CTRL,2}$ 714 signal. After time 736, the transistors 324 and 624 are on and current is dumped from the input node 302 to ground. At time 738, the host controller IC may indicate a start-up mode 726 by generating a low $V_{CTRL,1}$ 712 and low $V_{CTRL,2}$ 714 signal. After time 738, the transistor 324 is on and the transistor 654 is off and current is again provided to voltage regulator 312 to charge the capacitor 304A. At time 738A, the comparator 620 output $V_{CMP}$ of line 710 switches high indicating auxiliary voltage $V_{AUX}$ reached the first threshold level 752. The logic block 618 then switches off the transistor 324, and the capacitor 304A begins discharging again. At time 740, the host controller IC may indicate an off mode 728 by generating a low $V_{CTRL,1}$ signal 712 and a high $V_{CTRL,2}$ signal 714. The logic block 618 may turn off transistors 324 and 624 in off mode 728. The host controller IC may continue cycling through modes 724, 726, and 728 during normal operation of the LED-based bulb. As the host controller IC continues cycling, the timing duration of each of the modes may vary from cycle to cycle of the input voltage 702 as necessary to maintain a desired voltage level of $V_{DD,H}$.

Figure 8:
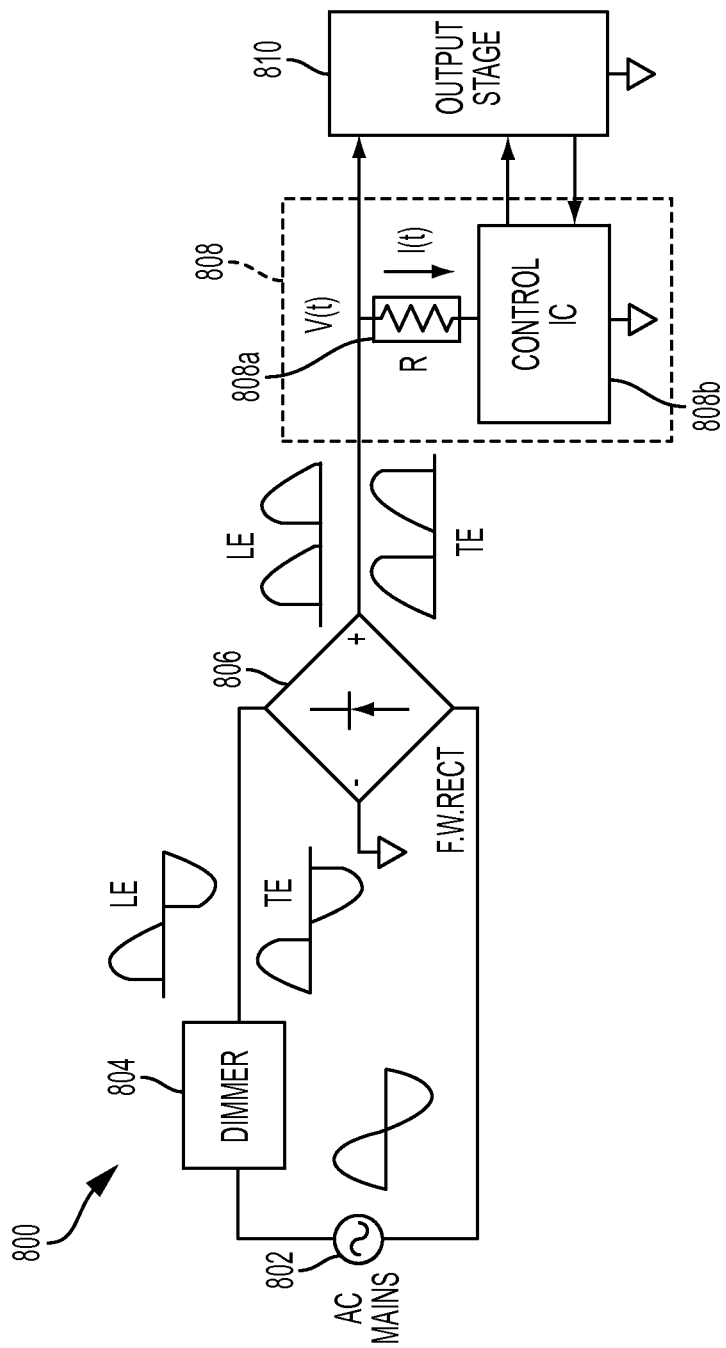
FIG. 8 is an example block diagram illustrating a dimmer system for a light-emitting diode (LED)-based bulb with a digitally-controlled switch-mode start-up circuit according to one embodiment of the disclosure.

The start-up circuits described above may be integrated into a dimmer circuit to provide dimmer compatibility with lighting devices. FIG. 8 is an example block diagram illustrating a dimmer system for a light-emitting diode (LED)-based bulb with a digitally-controlled switch-mode start-up circuit according to one embodiment of the disclosure. A system 800 may include a dimmer compatibility circuit 808 with a variable resistance device 808a and a control integrated circuit (IC) 808b. The dimmer compatibility circuit 808 may couple an input stage having a dimmer 804 and a rectifier 806 with an output stage 810, which may include light emitting diodes (LEDs). The system 800 may receive input from an alternating current (AC) mains line 802. The output stage 810 may include a power stage with a start-up circuit as described above. For example, the output stage 810 may include a digitally-controlled start-up circuit described above with reference to FIG. 3 and/or FIG. 6.

If implemented in firmware and/or software, the functions described above, such as functionality described with reference to FIG. 4 and FIG. 5, may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically erasable programmable read-only memory (EEPROM), compact disc-read only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. For example, although signals generated by a controller are described throughout as "high" or "low," the signals may be inverted such that "low" signals turn on a switch and "high" signals turn off a switch. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   receiving a line voltage at a field-effect transistor (FET);
   providing, by the field-effect transistor (FET), a current supply to a voltage regulator;
   generating, by the voltage regulator, a supply voltage for a lighting controller from the current supply; and
   operating, by a gate drive circuit coupled to a gate of the field-effect transistor (FET), the field-effect transistor (FET) in a switching-mode to provide a switching-mode power supply to the lighting controller, during a start-up phase of the lighting controller and a normal operating-mode after the start-up phase to provide dimmer compatibility,
   wherein the operating step includes operating the field-effect transistor (FET) in the following modes:
   a first mode as a switching-mode power supply for the lighting controller during the start-up phase of the lighting controller;
   a second mode that disables the current power train;
   a third mode that controls the current power train to conduct current from the line voltage input node to a ground; and
   a fourth mode that alternates driving current through the current power train to the voltage regulator and driving current through the current power train to a ground.

2. The method of claim 1, further comprising receiving, from the lighting controller, a mode selection for operating the field-effect transistor (FET) to provide dimmer compatibility.

3. The method of claim 1, further comprising:
   receiving a feedback signal indicating a voltage level at an output node coupled to the field-effect transistor (FET),
   wherein the step of operating the field-effect transistor (FET) as a switching-mode power supply comprises digitally switching the field-effect transistor (FET) based, at least in part, on the feedback signal.

4. The method of claim 1, wherein the step of operating the field-effect transistor (FET) after the start-up phase comprises turning off the field-effect transistor (FET).

5. The method of claim 1, wherein the step of operating the field-effect transistor (FET) after the start-up phase comprises controlling the field-effect transistor (FET) to conduct current from the line voltage input node to a ground.

6. The method of claim 5, further comprising turning on a second field-effect transistor (FET) coupled to the field-effect transistor (FET) and coupled to the ground.

7. The method of claim 1, wherein the step of operating the field-effect transistor (FET) after the start-up phase comprises alternating:
   driving current through the field-effect transistor (FET) and a diode to the voltage regulator; and
   driving current through the field-effect transistor (FET) to a ground.

8. The method of claim 7, further comprising:
   receiving a feedback signal indicating a voltage level at an output node coupled to the field-effect transistor (FET),
   wherein the step of alternating comprises alternating driving current through the field-effect transistor (FET) to the voltage regulator and driving current through the field-effect transistor (FET) to a ground based, at least in part, on the feedback signal.

9. An apparatus, comprising:
   a voltage regulator configured to generate an output voltage for supplying a lighting controller;
   a current power train comprising a field-effect transistor (FET) and coupled to the voltage regulator and a line voltage input node;
   a gate drive circuit coupled to a gate of the field-effect transistor (FET); and
   a logic circuit coupled to the gate drive circuit and configured to control the field-effect transistor (FET) in a switching-mode to provide a switching-mode power supply to the lighting controller, during a start-up phase of the lighting controller and to control the field-effect transistor (FET) in a normal operating-mode after the start-up phase to provide dimmer compatibility,
   wherein the logic circuit is configured to operate the current power train in the following modes:
   a first mode that operates the field-effect transistor (FET) as a switching-mode power supply for the lighting controller during the start-up phase of the lighting controller;
   a second mode that disables the current power train;
   a third mode that controls the current power train to conduct current from the line voltage input node to a ground; and
   a fourth mode that alternates driving current through the current power train to the voltage regulator and driving current through the current power train to a ground.

10. The apparatus of claim 9, wherein the current power train further comprises:
   a second field-effect transistor (FET) coupled to the field-effect transistor (FET); and
   a diode coupled to a source of the field-effect transistor (FET) and coupled to the drain of the second field-effect transistor (FET).

11. The apparatus of claim 10, wherein the field-effect transistor (FET) comprises a depletion-mode field-effect transistor (FET), and wherein the second field-effect transistor (FET) comprises an enhancement-mode field-effect transistor (FET).

12. The apparatus of claim 9, wherein the logic circuit comprises a mode input node configured to receive a mode input from the lighting controller, wherein the logic circuit is configured to control the current power train based, at least in part, on the mode input.

13. The apparatus of claim 9, further comprising a feedback loop coupled to the logic circuit, wherein the feedback loop provides a feedback signal indicating a difference between a voltage at an output of the current power train and a reference voltage, and wherein the logic circuit is configured to operate the current power train based, at least in part, on the feedback signal.

* * * * *